(12) United States Patent
Hall et al.

(10) Patent No.: US 7,572,134 B2
(45) Date of Patent: Aug. 11, 2009

(54) CENTERING ASSEMBLY FOR AN ELECTRIC DOWNHOLE CONNECTION

(76) Inventors: David R. Hall, 2185 S. Larsen Pkwy., Provo, UT (US) 84606; Christopher Durrand, 2185 S. Larsen Pkwy., Provo, UT (US) 84606; Joe Fox, 2185 S. Larsen Pkwy., Provo, UT (US) 84606; Tyson J. Wilde, 2185 S. Larsen Pkwy., Provo, UT (US) 84606

( * ) Notice: Subject to any disclaimer, the term of this patent is extended or adjusted under 35 U.S.C. 154(b) by 333 days.

(21) Appl. No.: 11/737,178

(22) Filed: Apr. 19, 2007

(65) Prior Publication Data

US 2008/0223569 A1 Sep. 18, 2008

Related U.S. Application Data

(63) Continuation-in-part of application No. 11/693,909, filed on Mar. 30, 2007, now Pat. No. 7,404,725, which is a continuation-in-part of application No. 11/621,183, filed on Jan. 9, 2007, application No. 11/737,178, which is a continuation of application No. 11/428,445, filed on Jul. 3, 2006, now Pat. No. 7,488,194.

(60) Provisional application No. 60/894,395, filed on Mar. 12, 2007.

(51) Int. Cl.
*H01R 4/64* (2006.01)
(52) U.S. Cl. .................................... 439/194
(58) Field of Classification Search ............ 439/190, 439/191, 194, 387, 426, 700; 166/65.1, 319
See application file for complete search history.

(56) References Cited

U.S. PATENT DOCUMENTS

| | | | |
|---|---|---|---|
| 2,414,719 A | 1/1947 | Cloud | |
| 3,967,201 A | 6/1976 | Rorden | |
| 4,416,494 A | 11/1983 | Watkins | |
| 4,785,247 A | 11/1988 | Meador | |
| 4,806,928 A | 2/1989 | Veneruso | |
| 5,337,002 A | 8/1994 | Mercer | |
| 6,223,826 B1 | 5/2001 | Chau | |
| 6,367,564 B1 | 4/2002 | Mills | |
| 6,392,317 B1 | 5/2002 | Hall | |
| 6,446,728 B2 | 9/2002 | Chau | |
| 6,651,755 B1 | 11/2003 | Kelpe | |
| 6,655,464 B2 | 12/2003 | Chau | |
| 6,670,880 B1 | 12/2003 | Hall | |

(Continued)

*Primary Examiner*—Khiem Nguyen
(74) *Attorney, Agent, or Firm*—Tyson J. Wilde; Benjamin T. Miskin

(57) ABSTRACT

A downhole tool string component having a tubular body having a bore with a central longitudinal axis. An electrical conductor assembly is disposed within the bore of the tubular component, the assembly having signal couplers at first and second ends adapted for a butt connection. Centering assemblies are disposed within each end of the bore and have a plurality of projections extending radially outward from at least a partial central ring disposed around a portion of each end of the electrical conductor assembly, at least one centering assembly comprising a radial opening in the central ring adapted to receive the electrical conductor assembly. The first and second ends of the electrical conductor assembly are substantially aligned to the central axis of the bore at each end by the centering assemblies, the centering assemblies being adapted to allow fluid to pass through the bore.

20 Claims, 7 Drawing Sheets

U.S. PATENT DOCUMENTS

| | | |
|---|---|---|
| 6,717,501 B2 | 4/2004 | Hall |
| 6,739,413 B2 | 5/2004 | Sharp |
| 6,799,632 B2 | 10/2004 | Hall |
| 6,821,147 B1 | 11/2004 | Hall |
| 6,830,467 B2 | 12/2004 | Hall |
| 6,844,498 B2 | 1/2005 | Hall |
| 6,845,822 B2 | 1/2005 | Chau |
| 6,888,473 B1 | 5/2005 | Hall |
| 6,913,093 B2 | 7/2005 | Hall |
| 6,929,493 B2 | 8/2005 | Hall |
| 6,945,802 B2 | 9/2005 | Hall |
| 6,968,611 B2 | 11/2005 | Hall |
| 7,028,779 B2 | 4/2006 | Chau |
| 7,150,329 B2 | 12/2006 | Chau |
| 2004/0104797 A1 | 6/2004 | Hall |
| 2004/0113808 A1 | 6/2004 | Hall |
| 2004/0145492 A1 | 7/2004 | Hall |
| 2004/0150532 A1 | 8/2004 | Hall |
| 2004/0164833 A1 | 8/2004 | Hall |
| 2004/0164838 A1 | 8/2004 | Hall |
| 2004/0216847 A1 | 11/2004 | Hall |
| 2004/0244916 A1 | 12/2004 | Hall |
| 2004/0244964 A1 | 12/2004 | Hall |
| 2004/0246142 A1 | 12/2004 | Hall |
| 2005/0001735 A1 | 1/2005 | Hall |
| 2005/0001736 A1 | 1/2005 | Hall |
| 2005/0001738 A1 | 1/2005 | Hall |
| 2005/0035874 A1 | 2/2005 | Hall |
| 2005/0035875 A1 | 2/2005 | Hall |
| 2005/0035876 A1 | 2/2005 | Hall |
| 2005/0036507 A1 | 2/2005 | Hall |
| 2005/0039912 A1 | 2/2005 | Hall |
| 2005/0045339 A1 | 3/2005 | Hall |
| 2005/0046586 A1 | 3/2005 | Hall |
| 2005/0046590 A1 | 3/2005 | Hall |
| 2005/0067159 A1 | 3/2005 | Hall |
| 2005/0070144 A1 | 3/2005 | Hall |
| 2005/0082092 A1 | 4/2005 | Hall |
| 2005/0092499 A1 | 5/2005 | Hall |
| 2005/0093296 A1 | 5/2005 | Hall |
| 2005/0095827 A1 | 5/2005 | Hall |
| 2005/0115717 A1 | 6/2005 | Hall |
| 2005/0145406 A1 | 7/2005 | Hall |
| 2005/0150653 A1 | 7/2005 | Hall |
| 2005/0161215 A1 | 7/2005 | Hall |
| 2005/0173128 A1 | 8/2005 | Hall |
| 2005/0212530 A1 | 9/2005 | Hall |
| 2005/0236160 A1 | 10/2005 | Hall |
| 2005/0284662 A1 | 12/2005 | Hall |

CENTERING ASSEMBLY FOR AN ELECTRIC DOWNHOLE CONNECTION

CROSS REFERENCE TO RELATED APPLICATIONS

This patent application is a continuation-in-part of U.S. patent application Ser. No. 11/693,909 filed on Mar. 30, 2007 now U.S. Pat. No. 7,404,725 and entitled Wiper for Tool String Direct Electrical Connection. U.S. patent application Ser. No. 11/693,909 is a continuation-in-part of U.S. patent application Ser. No. 11/621,183 filed on Jan. 9, 2007 and entitled Tool String Direct Electrical Connection. This application is also a continuation of U.S. patent application Ser. No. 11/428,445 filed on Jul. 3, 2006 now U.S. Pat. No. 7,488,194 and entitled Downhole Data and/or Power Transmission System. This application also claims priority to U.S. Provisional Patent Application Ser. 60/894,395 which was filed on Mar. 12, 2007 and entitled Horizontal Drilling. All of these applications are herein incorporated by reference in their entirety.

BACKGROUND OF THE INVENTION

The present invention relates to the field of data and/or power transmission. More specifically, it relates to the field of apparatus for transmitting data and/or power through such downhole tool strings.

Downhole tool strings, such as drill strings, injecting strings, and production strings, have become increasingly versatile in the last half century. In addition to traditional oil, gas, and geothermic exploration and production purposes, tubular tool strings are often used for what is known as horizontal directional drilling to install underground power lines, communication lines, water lines, sewer lines, and gas lines. This sort of downhole drilling is particularly useful for boring underneath roadways, waterways, populated areas, and environmentally protected areas.

The increased versatility of downhole drilling with tool strings has led to a higher demand for apparatus that are able to transmit a power signal to downhole equipment as well as transmit data between downhole and surface tools. Hence, several different approaches to solving the problem of transmitting an electrical signal across the joints of a tool string have been developed and are known in the art.

U.S. Pat. Nos. 6,670,880; and 6,717,501 to Hall, both of which are incorporated herein by reference for all that they disclose, teach of a system wherein tubular components are coupled at threaded joints and comprises a signal transmission system in the tool string. Other downhole telemetry systems are disclosed in U.S. Pat. No. 6,688,396 to Floerke et al and U.S. Pat. No. 6,641,434 to Boyle et al, which are also herein incorporated by reference for all that they contain.

Optimally, a system for transmitting power or data between surface equipment and downhole tools in a tool string should be transparent to the tool string operator or crew, as time delays introduced by a complicated telemetry system may represent a significant amount of money.

BRIEF SUMMARY OF THE INVENTION

In one aspect of the invention, a downhole tool string component having a tubular body having a bore with a central longitudinal axis. The tool string may be a drill string, injection string, coiled tubing, or a production string. An electrical conductor assembly is disposed within the bore of the tubular component, the assembly having signal couplers at first and second ends of the assembly adapted for a butt connection. Centering assemblies are disposed within each end of the bore and have a plurality of projections extending radially outward from at least a partial central ring disposed around a portion of each end of the electrical conductor assembly, at least one centering assembly comprising a radial opening in the central ring adapted to receive the electrical conductor assembly. The first and second ends are substantially aligned to the central axis of the bore at each end by the centering assemblies, the centering assemblies being adapted to allow fluid to pass through the bore.

The central ring may comprise a gate. The central ring of at least one centering assembly may comprise a spring. The component may comprise a spring intermediate at least one centering assembly and a portion of the component. At least one centering assembly may comprise two central rings. At least one centering assembly may comprise an outer bearing surface. The centering assemblies may be disposed within recesses formed in a bore wall. The centering assemblies may be adapted to grip flared portions of the electrical conductor assembly. At least one centering assembly may comprise a first collar adapted to interlock with a second collar. The projections may connect to an outer ring of the centering assemblies.

The signal couplers may be direct electrical couplers. The signal couplers may comprise two concentric electrical contacts electrically isolated from each other by a dielectric material. The electrical contacts may comprise a material selected from the group consisting of tungsten carbide, beryllium copper, cemented metal carbide, hardened steel, copper, nickel, hard metal and combinations thereof. The dielectric material may comprise a material selected from the group consisting of alumina, ferrite, polycrystalline diamond, carbon, and/or oxides of Mg, Al, Si, Yb, Ca, Be, Sr, Ns, Sm, Er, Eu, Sc, La, Gd, Dy, Tm, and combinations thereof.

In another aspect of the invention, a downhole signal transmission system comprises first and second tubular bodies joined together at tool joints, each body comprising a bore having a central axis. An electrical conductor assembly may be disposed within the bore of each tubular component, at least one end of each assembly comprising a signal coupler, the couplers being coupled together to form a butt connection. Centering assemblies may be disposed within the bore of each body and may comprise a plurality of projections extending radially outward from at least a partial central ring disposed around a portion of each electrical conductor assembly proximate the signal coupler, at least one centering assembly comprising a radial opening in the central ring adapted to receive the electrical conductor assembly. The ends of each electrical conductor assembly may be substantially aligned to the central axis of each bore by the centering assemblies, the centering assemblies being adapted to allow fluid to pass through the bore.

The conductor assemblies may comprise steel armoring which forms a metal to metal seal adapted to prevent an inner conductor of the assemblies from shorting to the tubular bodies. The armoring may comprise a plurality of radial grooves at a signal coupler. The electrical conductor may comprise a coaxial cable, a twisted pair of wires, a copper wire, a triaxial cable, or combinations thereof.

In another aspect of the invention, a downhole tool string component comprises a tubular body comprising an inner most bore having a central longitudinal axis. An electrical conductor assembly may be disposed within the bore of and along the central axis of the tubular component, the assembly comprising signal couplers at first and second ends adapted for a butt connection. Centering assemblies may be disposed within the bore and may comprise a plurality of projections extending radially outward from a central ring to an outer ring. The central ring may be held against a distal diameter increase at the end of the electrical conductor assembly, at least one centering assembly comprising a radial opening in the central ring adapted to receive the electrical conductor assembly. The outer ring may be firmly held against a lip formed in the bore of the component, wherein the centering assemblies may be adapted to allow fluid to pass through the bore.

DETAILED DESCRIPTION OF THE INVENTION AND THE PREFERRED EMBODIMENT

Figure 1:
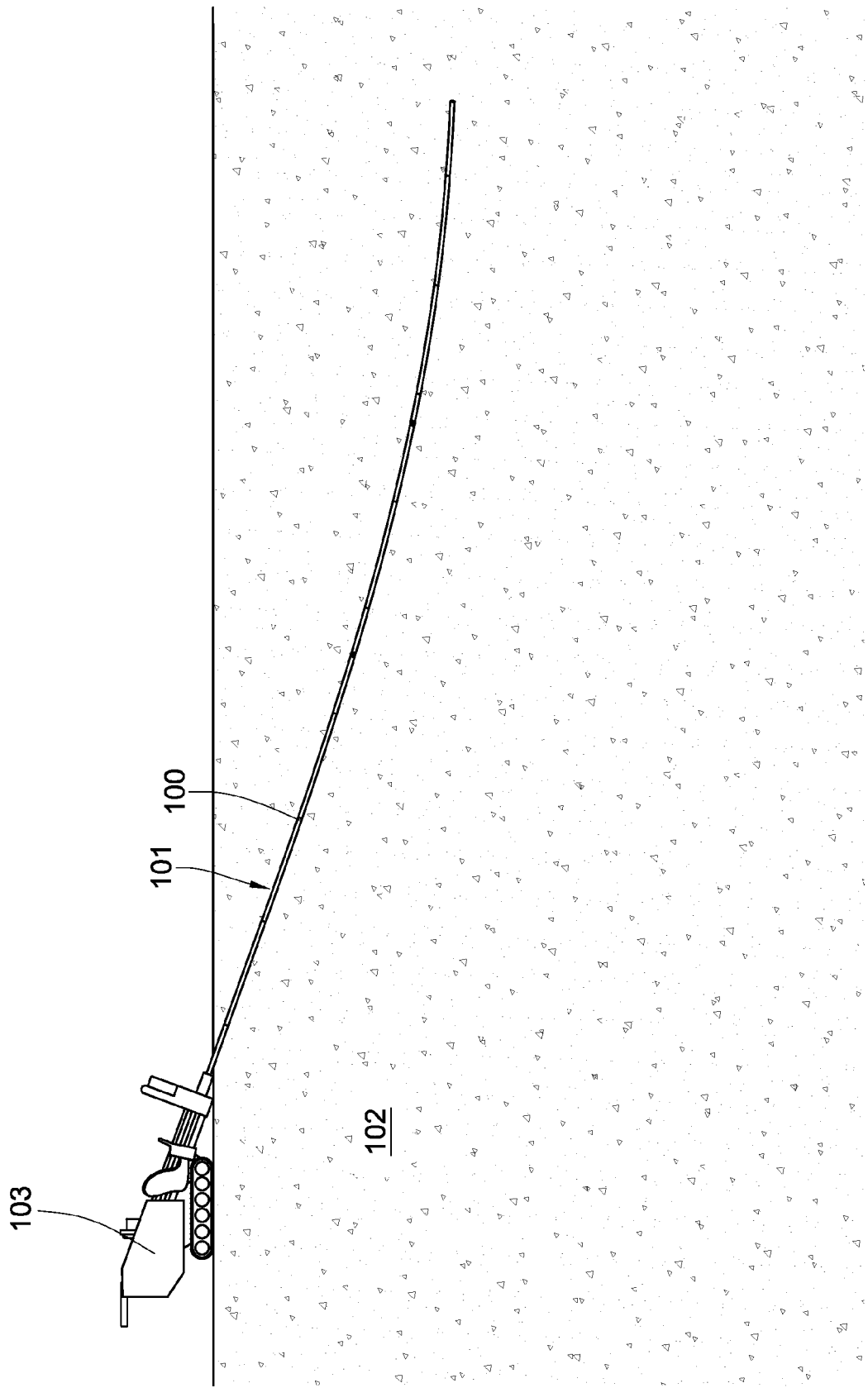
FIG. 1 is a cross-sectional diagram of an embodiment of a drill string in a horizontal drill well.

A drill string 100 may drill a bore hole 101 in a subterranean formation 102 in a horizontal or vertical direction. In the embodiment of FIG. 1, a rig 103 is placed at the surface and is angled such that the drill string 100 penetrates the surface at a non-perpendicular angle. In horizontal drilling applications often, as the drill string 100 advances, the bore hole 101 gradually becomes generally parallel to the surface and then eventually returns to the surface at a predetermined location, at which time a back reamer may be attached to the drill string 100 and pulled back through the bore hole 101 in order to widen the hole for pipe and other tools to be inserted. Cables such as fiber optic or electrical cable may also be attached to the drill string 100 as it is pulled back through the bore hole 101.

To accomplish horizontal directional drilling, the drill string 100 may comprise a steering mechanism. The steering mechanism may allow the drill string 100 to change direction while drilling, which may allow the drill string 100 to avoid known obstacles such as bodies of water, existing pipes and services, or paved surfaces. Surface equipment, which may be part of the rig 103, may allow drill string operators to observe and manually control the direction of the bore hole 101, as well as possibly monitor conditions in the formation and or bore hole.

Figure 2:
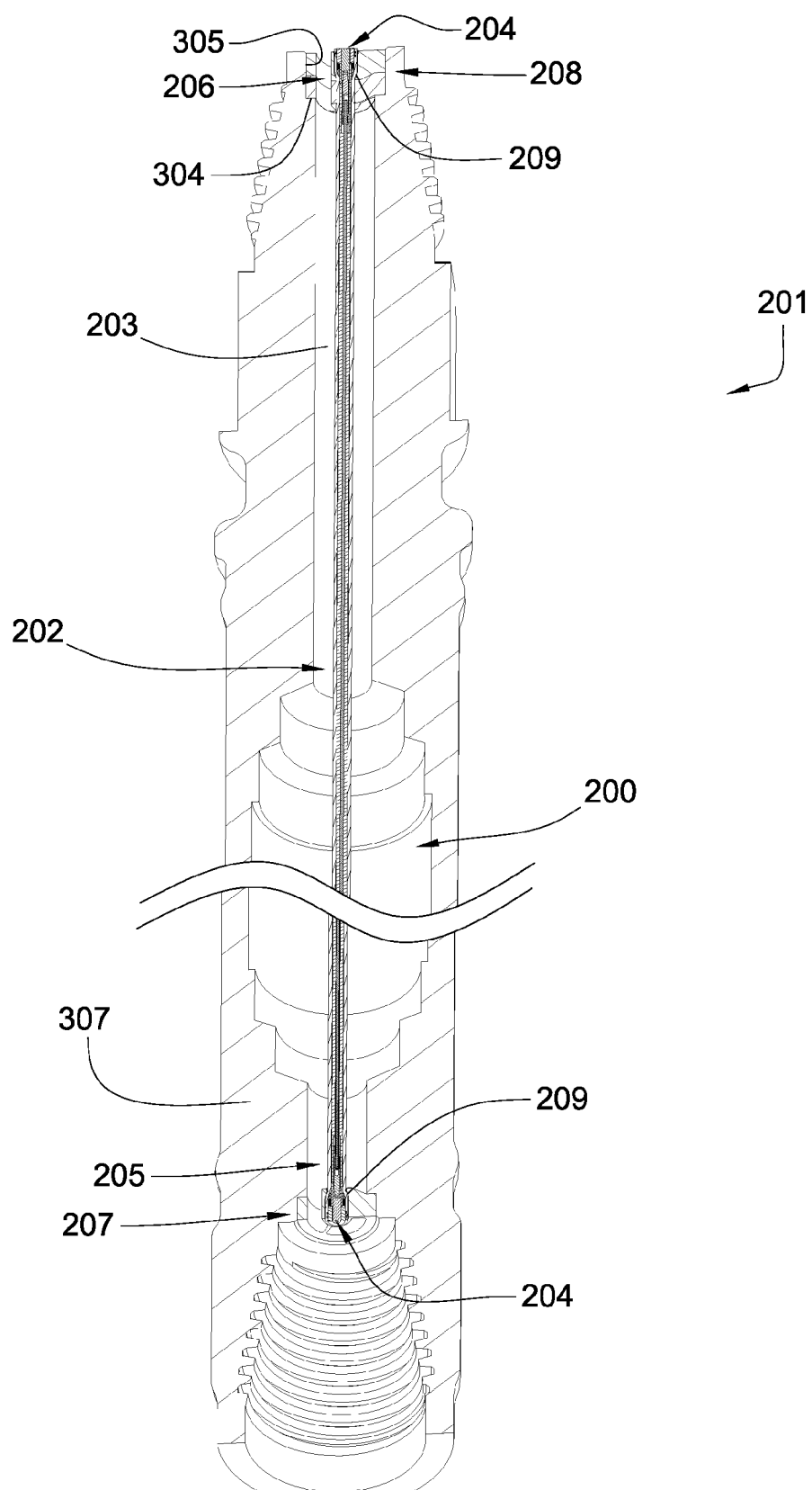
FIG. 2 is a cross-sectional diagram of an embodiment of a downhole tool string component.

In the embodiment of FIG. 2, power and/or data to the steering mechanism or other downhole instruments may be transferred via a downhole transmission system 200. Each individual tubular tool string component 201 in the transmission system 200 comprises an electrical conductor assembly 202 disposed within the bore 203 of the component. The assembly 202 may be a coaxial cable, a twisted pair of wires, a copper wire, a triaxial cable, or combinations thereof. The conductor assembly 202 comprises signal couplers 204 at first and second ends 205, 206 of the assembly 202. The assembly 202 comprises a length such that when the component 201 is coupled with other components at each end of the component 201, the signal couplers 204 are adapted to establish a signal connection with the assemblies of the adjacent components. The signal connection may be either a direct electrical connection or an inductive connection.

In order to establish a solid connection, the component 201 comprises a centering assembly within each end of the bore 203 which centers and stabilizes the ends 205, 206 of the conductor assembly 202 within the bore 203 such that the signal couplers of the conductor assemblies in adjacent components are substantially aligned with one another. The first end 205 of the conductor assembly 202 may be held in place by a first centering assembly 207, while the second end 206 of the conductor assembly 202 may be held in place by a second centering assembly 208. The centering assemblies 207, 208 may be adapted to grip flared portions 209 of each end of the conductor assembly 202.

Figure 3:
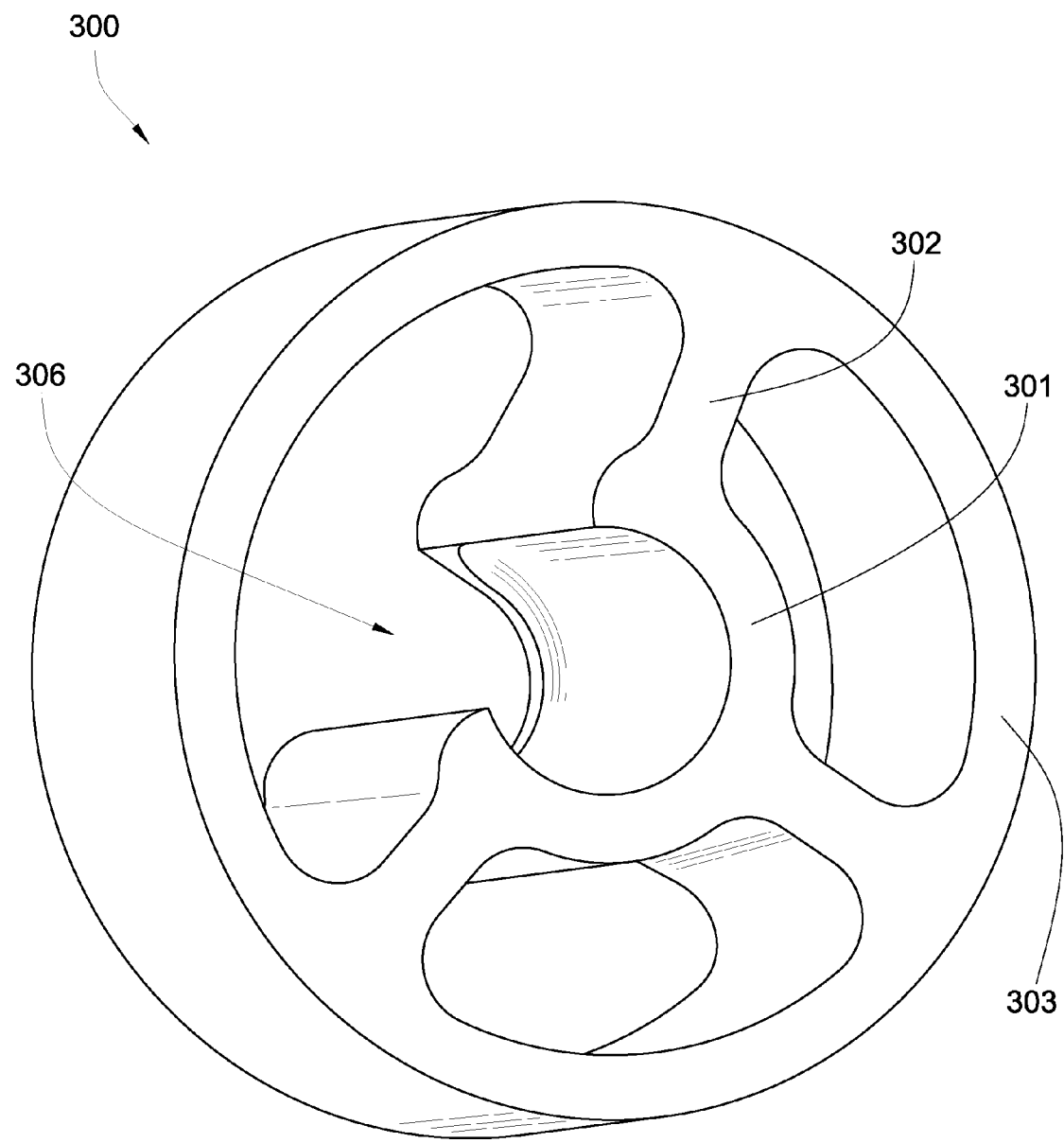
FIG. 3 is a perspective diagram of an embodiment of a centering assembly.

Also referring to the embodiment shown in FIG. 3, the centering assemblies 207, 208 may comprise a collar 300 comprising at least a portion of a central ring 301 with a plurality of projections 302 extending radially outward from the central ring 301. The projections 302 may connect to an outer ring 303, which may provide radial support for the centering assembly. The outer ring 303 or another portion of the centering assembly may abut a lip 304 in a recess 305 of the bore wall 307 of the tool string component 201. The centering assembly may possibly comprise a spring intermediate the lip 304 and the outer ring 303. In the embodiment of FIG. 2, the second centering assembly 208 comprises two collars 300 while the first centering assembly 207 comprises one, though each centering assembly may comprise one or more collars 300.

At least one central ring 301 of one of the centering assemblies 207, 208 comprises a radial opening 306 adapted to receive the conductor assembly 202. The radial opening 306 may aid the installment of the conductor assembly 202 within the bore 203. During assembly, the first end 205 of the conductor assembly 202 may be inserted into the first centering assembly 207 before inserting the conductor assembly 202 into the tool string component 201. After inserting the conductor assembly 202 into the bore 203, along with the first centering assembly 207 into a recess 305 in the bore wall 307, the second end 206 of the conductor assembly 202 may be inserted into the second centering assembly 208.

Figure 4:
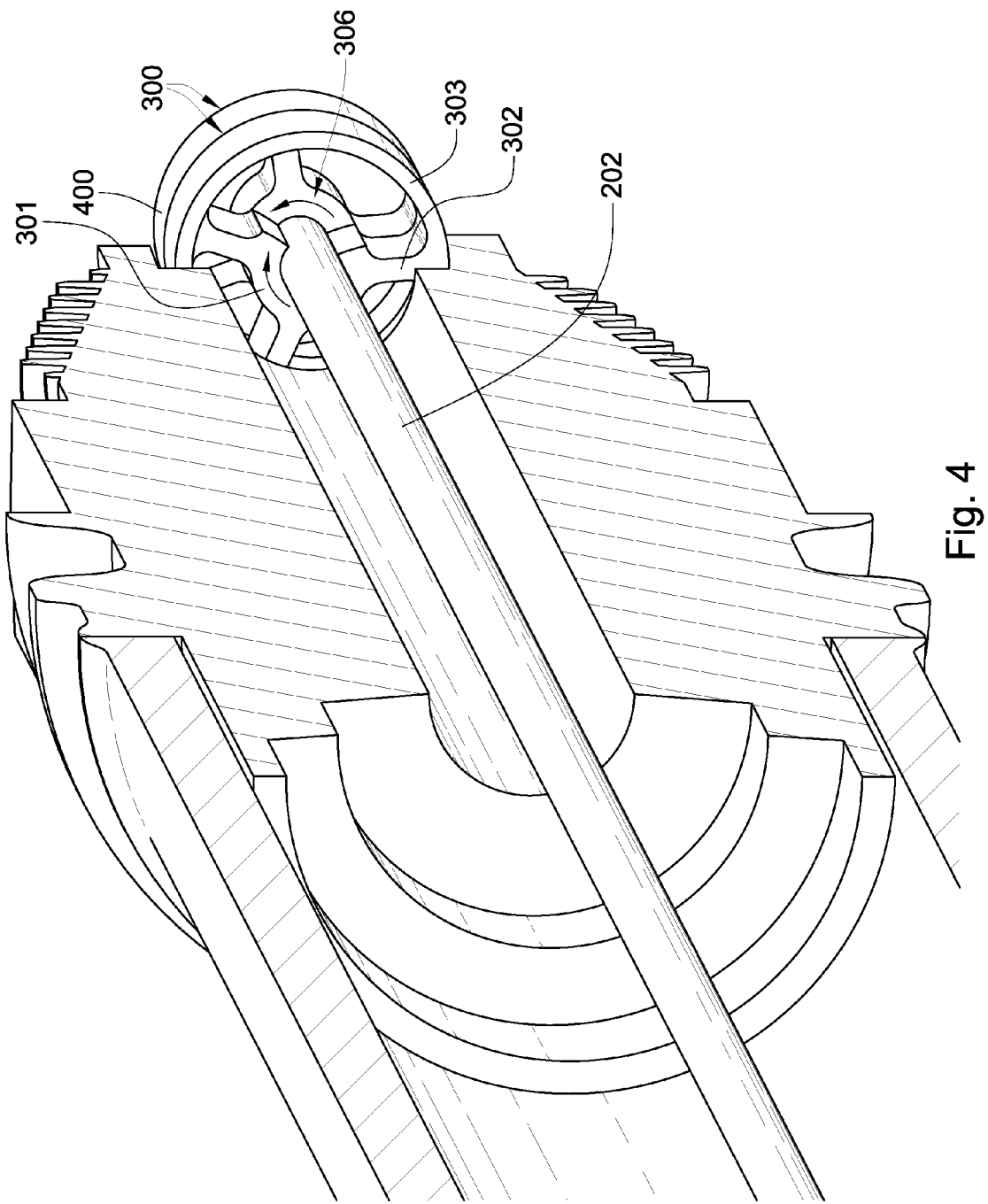
FIG. 4 is a cross-sectional diagram of another embodiment of a downhole tool string component.

Referring now to the embodiment of FIG. 4, the second centering assembly 208 may comprise two individual collars 300, each with separate central rings 301, projections 302, and outer rings 303. Both collars 300 may comprise radial openings 306 in the central ring 301 such that during installation, aligning the openings 306 allows the conductor assembly 202 to be inserted into the openings 306. After inserting the conductor assembly 202 into the openings 306, one or both of the collars 300 may be rotated such that the openings 306 are no longer aligned, preventing the conductor assembly 202 from slipping out of the central ring. To facilitate the collar's rotation, one or both of the collars 300 may comprise an outer bearing surface on the outside diameter 400 of the collar 300. A portion of the conductor assembly 200 may also comprise a bearing surface.

Figure 5:
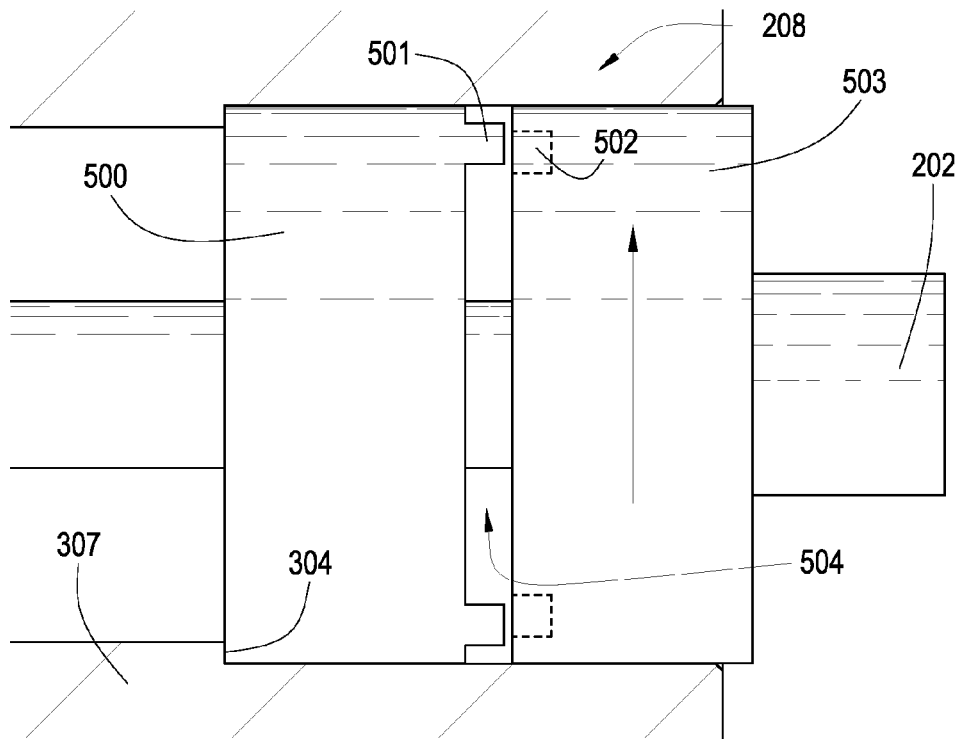
FIG. 5 is a cross-sectional diagram of another embodiment of a downhole tool string component.

The centering assembly 208 may comprise two collars adapted to interlock with each other in order to prevent undesired rotation of one of the collars with respect to the other. A first collar 500 may comprise protrusions 501, either on the outer ring or central ring, adapted to interlock with recesses 502 of a second collar 503 (or the first collar may comprise recesses and the second collar may comprise protrusions), as in the embodiment of FIG. 5. The collars 500, 503 may be designed such that when the radial openings of the central rings of each collar are aligned to allow the conductor assembly 202 to be inserted into the central rings, the protrusions 501 do not align with the recesses 502, forcing a gap 504 between the two collars 500, 503. As the second collar 503 is rotated, the protrusions 501 may align with the recesses 502, causing the two collars 500, 503 to come together and interlock, preventing them from rotating with respect to one another. The rotation also causes the radial openings to misalign such that the conductor assembly 202 is locked into the center of the centering assembly 208. Tension in the conductor assembly 202 may hold the collars 500, 503 flush with a lip 304 in the bore wall 307.

Figure 6:
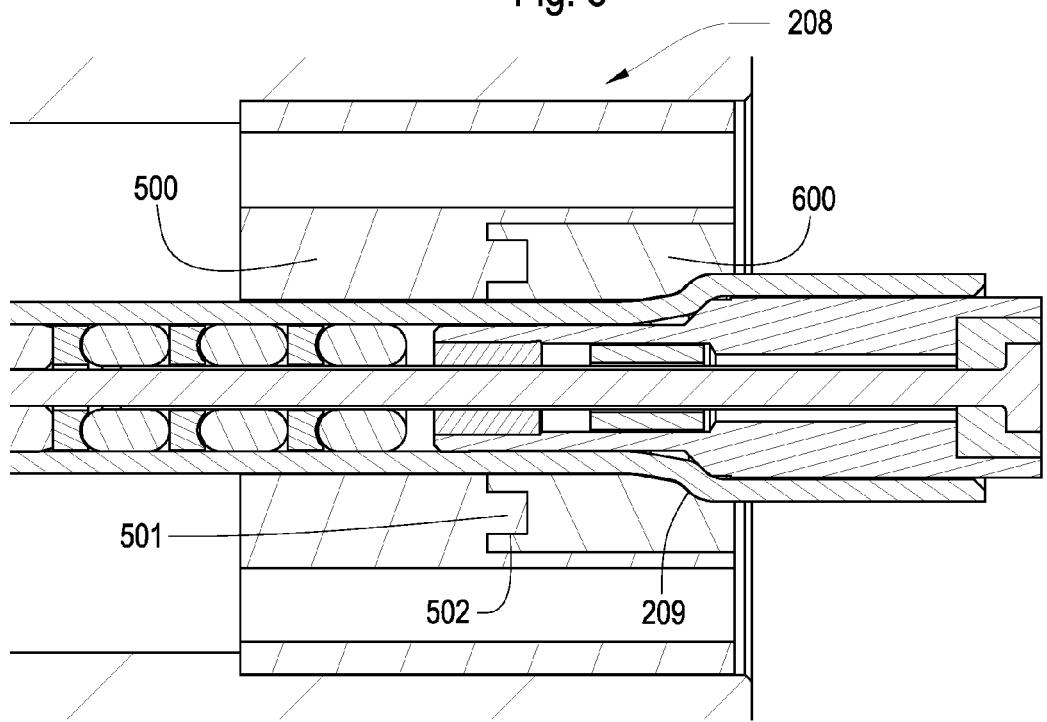
FIG. 6 is a cross-sectional diagram of another embodiment of a downhole tool string component.

The centering assembly 208 may also comprise a second central ring 600 adapted to be inserted into a recess 601 in a first central ring 602 of a collar 300, as in the embodiment of FIG. 6. The first central ring 602 may comprise protrusions 501 in the recess 601 adapted to fit into recesses 502 in the second central ring 600. The second central ring 600 may be designed and fitted around the conductor assembly 208 such that the ring 600 grips the flared portion 209 of the conductor assembly 202. As the second central ring 600 is rotated such that the protrusions 501 of the first central ring 602 align with the recesses 502 of the second central ring 600, the second central ring 600 becomes flush with the first central ring 602 and holds the conductor assembly 202 in place.

Figure 7:
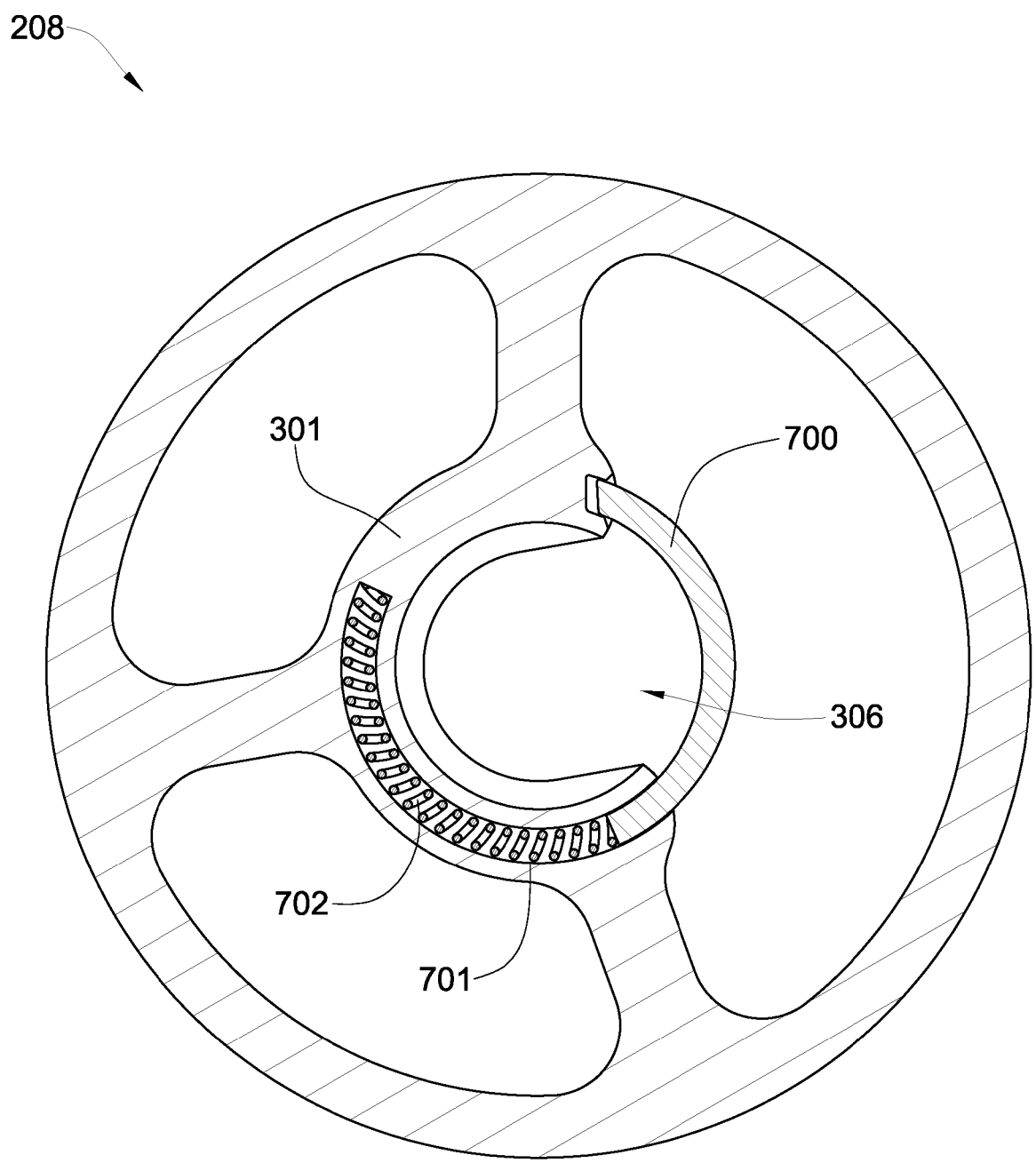
FIG. 7 is a cross-sectional diagram of another embodiment of a centering assembly.

Referring to the embodiment of FIG. 7, the centering assembly 208 may comprise a gate 700 over the radial opening 306. The gate 700 may be a lever or other extension which may be housed in a recess 701 in the central ring 301. The gate 700 may be spring loaded by a spring 702 inside the recess 701 such that the gate's resting state is in a closed position over the radial opening 306 in order to keep the conductor assembly centered within the central ring 301. The gate 700 may also be initially in an open position until triggered to the closed position by positioning the conductor assembly within the central ring. The central ring 301 may also provide radial support at both ends of the gate 700.

Figure 8:
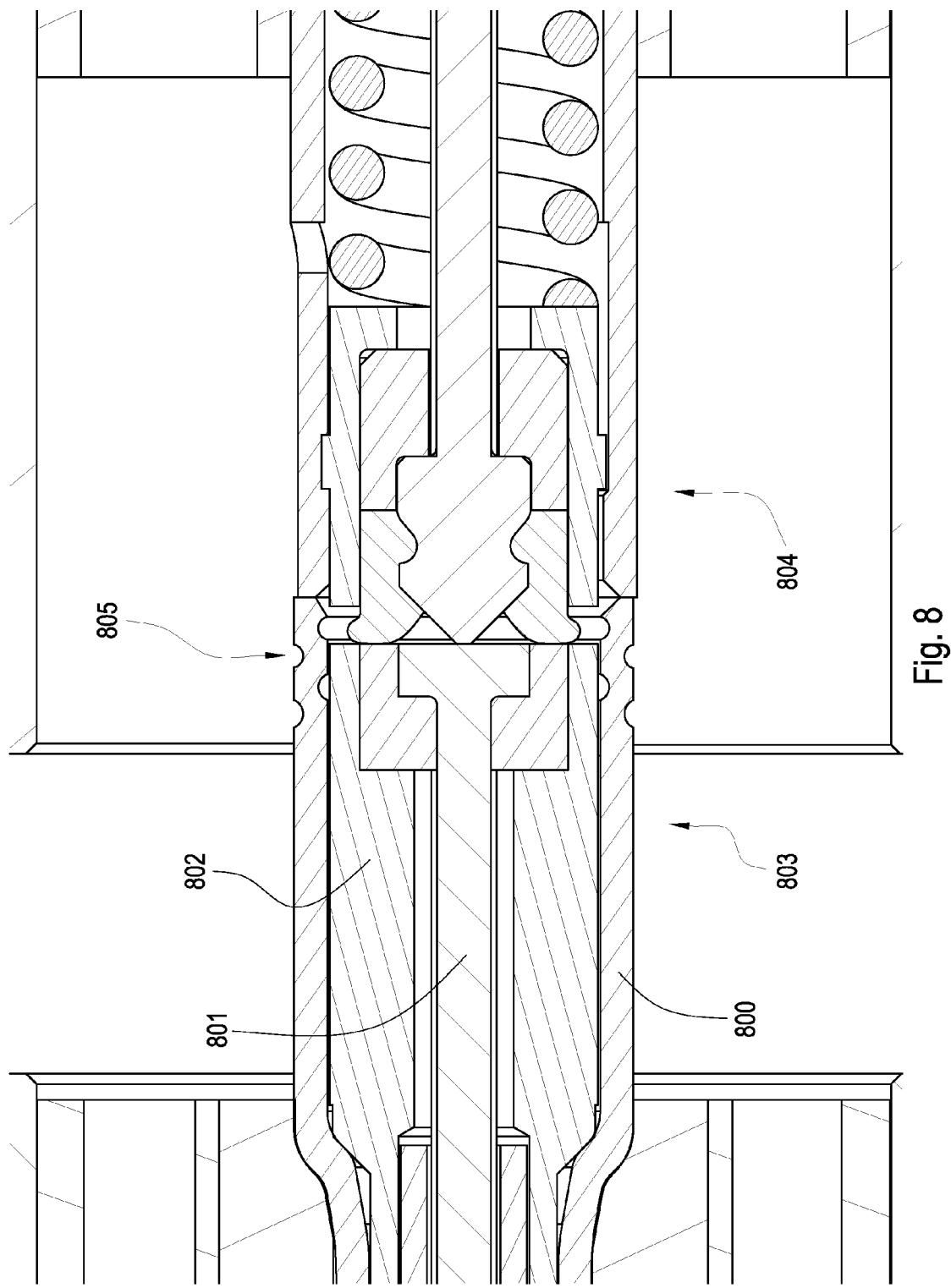
FIG. 8 is a cross-sectional diagram of an embodiment of two signal couplers in separate downhole tool string components.

The conductor assembly may comprise a stainless steel armoring 800 separated from an inner conductor 801 by a dielectric material 802, as in the embodiment of FIG. 8, the inner conductor 801 and the armoring 800 being concentric electrical contacts. The electrical contacts 800, 801 may comprise a material selected from the group consisting of tungsten carbide, beryllium copper, cemented metal carbide, hardened steel copper, nickel, hard metal and combinations thereof. The dielectric material 802 may comprise a material selected from the group consisting of alumina, ferrite, polycrystalline diamond, carbon, and/or oxides of Mg. Al, Si, Yb, Ca, Be, Sr, Ns, Sm, Er, Eu, Sc, La, Gd, Dy, Tm, and combinations thereof.

As two signal couplers 803, 804 come in contact with each other to form a butt connection as shown, the couplers 803, 804 may experience an axial compression, which may cause the armoring 800 of each signal coupler 803, 804 to contact one another to form a metal to metal seal, creating a solid electrical connection adapted to prevent the inner conductor 801 from electrically shorting to the drilling mud in the tool string components. The armoring 800 may comprise a plurality of grooves 805 which may allow the armoring 800 to axially compress, which may improve the electrical connection.

Whereas the present invention has been described in particular relation to the drawings attached hereto, it should be understood that other and further modifications apart from those shown or suggested herein, may be made within the scope and spirit of the present invention.

What is claimed is:

1. A downhole tool string component, comprising:
   a tubular body comprising a bore having a central longitudinal axis;
   an electrical conductor assembly disposed within the bore of the tubular component, the assembly comprising signal couplers at first and second ends of the conductor assembly adapted for a butt connection; and
   centering assemblies disposed within each end of the bore and comprising a plurality of projections extending radially outward from at least a partial central ring disposed around a portion of each end of the electrical conductor assembly, at least one centering assembly comprising a radial opening in the central ring adapted to receive the electrical conductor assembly;
   wherein the first and second ends are substantially aligned to the central axis of the bore at each end by the centering assemblies, the centering assemblies being adapted to allow fluid to pass through the bore.

2. The component of claim 1, wherein the central ring of at least one centering assembly comprises a spring.

3. The component of claim 1, wherein the component comprises a spring intermediate at least one centering assembly and a portion of the component.

4. The component of claim 1, wherein at least one centering assembly comprises two central rings.

5. The component of claim 1, wherein the central ring comprises a gate.

6. The component of claim 1, wherein at least one centering assembly comprises an outer bearing surface.

7. The component of claim 1, wherein the centering assemblies are disposed within machined recesses formed in a bore wall proximate each end.

8. The component of claim 1, wherein the centering assemblies are adapted to grip flared portions of the electrical conductor assembly.

9. The component of claim 1, wherein at least one centering assembly comprises a first collar adapted to interlock with a second collar.

10. The component of claim 1, wherein the projections connect to an outer ring of the centering assemblies.

11. The component of claim 1, wherein the signal couplers are direct electrical butt type couplers.

12. The component of claim 1, wherein the electrical conductor comprises a coaxial cable, a twisted pair of wires, a copper wire, a triaxial cable, or combinations thereof.

13. The component of claim 1, wherein the signal couplers comprises two concentric electrical contacts electrically isolated from each other by a dielectric material.

14. The component of claim 13, wherein the electrical contacts comprise a material selected from the group consisting of tungsten carbide, beryllium copper, cemented metal carbide, hardened steel, copper, nickel, hard metal and combinations thereof.

15. The component of claim 13, wherein the dielectric material comprises a material selected from the group consisting of alumina, ferrite, polycrystalline diamond, carbon, and/or oxides of Mg, Al, Si, Yb, Ca, Be, Sr, Ns, Sm, Er, Eu, Sc, La, Gd, Dy, Tm, and combinations thereof.

16. The component of claim 1, wherein the electrical conductor assembly comprises a stainless steel armoring.

17. The component of claim 16, wherein the stainless steel armoring comprises a plurality of radial grooves at a signal coupler.

18. A downhole signal transmission system, comprising:

first and second tubular bodies coupled together by mating threads, each body comprising a bore having a central axis;

an electrical conductor assembly disposed within the bore of each tubular component, at least one end of each assembly comprising a signal coupler, the couplers being coupled together to form a butt connection; and centering assemblies disposed within the bore of each body and comprising a plurality of projections extending radially outward from at least a partial central ring disposed around a portion of each electrical conductor assembly proximate the signal coupler, at least one centering assembly comprising a radial opening in the central ring adapted to receive the electrical conductor assembly;

wherein the ends of each electrical conductor assembly are substantially aligned to the central axis of each bore by the centering assemblies, the centering assemblies being adapted to allow fluid to pass through the bore.

19. The system of claim 18, wherein the conductor assemblies comprise steel armoring which forms a metal to metal seal adapted to prevent an inner conductor of the assemblies from shorting to the tubular bodies.

20. A downhole tool string component, comprising:

a tubular body comprising a inner most bore having a central longitudinal axis;

an electrical conductor assembly disposed within the bore of and along the central axis of the tubular component, the assembly comprising signal couplers at first and second ends adapted for a butt connection; and centering assemblies disposed within each end of the bore and comprising a plurality of projections extending radially outward from a central ring to an outer ring;

the central ring is held against a distal diameter increase at the end of the electrical conductor assembly, at least one centering assembly comprising a radial opening in the central ring adapted to receive the electrical conductor assembly;

the outer ring being firmly held against a lip formed in the bore of the component;

wherein the centering assemblies are adapted to allow fluid to pass through the bore.

* * * * *